United States Patent
Watanabe et al.

(10) Patent No.: US 10,882,969 B2
(45) Date of Patent: Jan. 5, 2021

(54) METHOD FOR PRODUCING RUBBER MOLDING

(71) Applicant: NICHIAS CORPORATION, Tokyo (JP)

(72) Inventors: Tomokazu Watanabe, Tokyo (JP); Tetsuo Oohinata, Tokyo (JP); Nahoko Kitajima, Tokyo (JP)

(73) Assignee: NICHIAS CORPORATION, Tokyo (JP)

(*) Notice: Subject to any disclaimer, the term of this patent is extended or adjusted under 35 U.S.C. 154(b) by 0 days.

(21) Appl. No.: 14/396,942

(22) PCT Filed: Apr. 25, 2013

(86) PCT No.: PCT/JP2013/062300
§ 371 (c)(1),
(2) Date: Oct. 24, 2014

(87) PCT Pub. No.: WO2013/161969
PCT Pub. Date: Oct. 31, 2013

(65) Prior Publication Data
US 2015/0137408 A1 May 21, 2015

(30) Foreign Application Priority Data
Apr. 27, 2012 (JP) ................. 2012-102824

(51) Int. Cl.
*C08J 9/00* (2006.01)
*C08K 5/23* (2006.01)
*C08J 3/24* (2006.01)

(52) U.S. Cl.
CPC .......... *C08J 9/0028* (2013.01); *C08J 3/24* (2013.01); *C08K 5/23* (2013.01); *C08J 2321/00* (2013.01)

(58) Field of Classification Search
CPC .......... C08J 9/0028; C08J 3/24; C08K 5/23
See application file for complete search history.

(56) References Cited

U.S. PATENT DOCUMENTS

| | | | |
|---|---|---|---|
| 4,142,956 A | 3/1979 | Shikinami et al. | |
| 4,368,280 A * | 1/1983 | Yui | C08J 3/21 523/211 |
| 5,305,565 A * | 4/1994 | Nagahama | A47L 23/266 52/177 |
| 6,497,261 B1 * | 12/2002 | Fukushima | B60C 1/0016 152/209.4 |
| 2007/0093607 A1 * | 4/2007 | Ashiura | C08F 8/30 525/260 |
| 2009/0093587 A1 * | 4/2009 | Ashiura | C08K 5/3435 524/572 |
| 2011/0089646 A1 | 4/2011 | Omura et al. | |
| 2011/0224382 A1 | 9/2011 | Kitano et al. | |

FOREIGN PATENT DOCUMENTS

| | | | |
|---|---|---|---|
| EP | 444604 A2 * | 9/1991 | |
| GB | 2005691 A | 4/1979 | |
| GB | 2009183 A * | 6/1979 | |
| JP | A-53-12963 | 2/1978 | |
| JP | A-61-190531 | 8/1986 | |
| JP | A-11-049896 | 2/1999 | |
| JP | H11-080422 A | 3/1999 | |
| JP | A-2001-354806 | 12/2001 | |
| JP | 2002-127714 A | 5/2002 | |
| JP | 2008-019401 * | 1/2008 | |
| JP | 2008-019401 A | 1/2008 | |
| JP | 2008-149934 * | 7/2008 | |
| JP | 2009-074014 A | 4/2009 | |
| JP | 2009-191241 A | 8/2009 | |
| JP | 2009-242623 A | 10/2009 | |
| JP | 2011-099558 A | 5/2011 | |
| JP | 2012-031231 A | 2/2012 | |
| JP | 2012-041506 A | 3/2012 | |
| JP | B2-5312963 | 10/2013 | |
| WO | 2010-035808 A1 | 4/2010 | |

OTHER PUBLICATIONS

EP 444604, machine translation (claims and specification), Sep. 1991.*
JP 2008-149934, machine translation, Jul. 2008.*
May 28, 2013 International Search Report issued in International Application No. PCT/JP2013/062300.
Oct. 28, 2015 Extended Search Report issued in European Patent Application No. 13781923.1.
Chekulaeva, V.V. et al., "Structural network of sulfur-free," Database CA [Online] Chemical Abstracts Service, May 12, 1984, XP002746554.
Shvetsova, T.P. et al., "Sulfur-free porous rubbers," Database CA [Online] Chemical Abstracts Service, May 12, 1984, XP002746555.
Oct. 28, 2014 International Preliminary Report on Patentability issued in International Application No. PCT/JP2013/062300.
Nov. 7, 2017 Office Action issued in European Patent Application No. 13781923.1.
V. V. Chekulaeva et al., "Structural network of sulfur-free rubbers," vol. 16, No. 9, Jan. 1, 1974, pp. 59-61.

* cited by examiner

*Primary Examiner* — Peter D. Mulcahy
(74) *Attorney, Agent, or Firm* — Oliff PLC

(57) ABSTRACT

A method of producing a rubber molded article, involving utilizing a compound different from a compound that has been used as a crosslinking agent. The method of producing a rubber molded article includes a crosslinking step of crosslinking a rubber component by decomposing a compound to be used as a crosslinking agent for the rubber component, the compound including a structure represented by the following formula (I), in a rubber composition containing the rubber component and the compound, the rubber composition including a sulfur content of 2.0 wt % or less: $\alpha\text{-}\beta\text{-}\gamma$ . . . (I) (in the formula (I), $\alpha$ represents a monovalent organic group, $\beta$ represents —N=N—, and $\gamma$ represents hydrogen or a monovalent organic group).

14 Claims, No Drawings

METHOD FOR PRODUCING RUBBER MOLDING

TECHNICAL FIELD

The present invention relates to a method of producing a rubber molded article.

BACKGROUND ART

For example, a synthetic rubber containing a C=C unsaturated hydrocarbon in its structure, as typified by a butadiene rubber, is provided with excellent elasticity through crosslinking of polybutadiene molecules constituting the butadiene rubber to each other through use of a crosslinking agent.

As a method of crosslinking a rubber composition, use of a sulfur compound as the crosslinking agent has been generally known since a long time ago. When the sulfur compound is used as the crosslinking agent, the sulfur-crosslinked product has a C—S covalent bond. In addition, the C—S covalent bond is a very strong bond, and hence the synthetic rubber crosslinked with the sulfur compound is excellent in that the synthetic rubber is provided with excellent heat resistance as well as improved elasticity.

For example, Patent Literature 1 describes a vibration damping material characterized by including a foam having a tan δ of more than 0.25, which is obtained by heating and foaming a foamable rubber composition having compounded therein, with respect to 100 parts by weight of NBR having a bound acrylonitrile content of 31% or more, 5 to 25 parts by weight of sulfur, 5 to 200 parts by weight of a phenol resin, and 5 to 40 parts by weight of a foaming agent.

In addition, it is known that a C—C covalent bond is a stronger bond than the C—S covalent bond, and that a peroxide is hence used as the crosslinking agent to further improve heat resistance.

For example, Patent Literature 2 describes a rubber composition characterized by containing NBR or hydrogenated NBR having a nitrile content of 36% or less, fired clay, and an organic peroxide.

CITATION LIST

Patent Literature

[Patent Literature 1] JP 11-49896 A
[Patent Literature 2] JP 2001-354806 A

SUMMARY OF INVENTION

Technical Problem

Incidentally, in recent years, a reduction in free sulfur in a rubber molded article has been strongly demanded by, for example, the automotive industry. Accordingly, it has been desired to establish a method of producing a rubber molded article without using a sulfur compound as a crosslinking agent.

In addition, in a method involving using a peroxide as a crosslinking agent in a rubber composition, a radical (COO.) to be generated in a crosslinking reaction easily reacts with oxygen in the atmosphere, and hence the reaction cannot be performed under an atmospheric atmosphere. Accordingly, for example, the reaction is performed under an inert gas atmosphere of nitrogen or the like (under an inert atmosphere).

Thus, in order to perform peroxide crosslinking, it is generally necessary to prepare a closed space filled with an inert gas. Further, when the peroxide crosslinking is performed in the closed space, a batch system is naturally adopted as a production system, and it is difficult to adopt a production process of the so-called continuous system. In addition, as long as the reaction field is constantly kept under the inert gas atmosphere (under the inert atmosphere), it is theoretically possible to perform the peroxide crosslinking in an open space, which, however, requires continuous supply of a predetermined inert gas, resulting in an increase in production cost of the rubber molded article. In consideration of the circumstances as described above, it has been desired to establish a method of producing a rubber molded article without using a peroxide as a crosslinking agent.

In view of the situation as described above, the inventors have keenly studied: a novel method involving utilizing any of various compounds as a crosslinking agent for a rubber composition; and a method of producing a rubber molded article.

One object of the present invention is to provide a method of producing a rubber molded article, involving utilizing a compound different from a compound that has heretofore been used as a crosslinking agent. In addition, the above-mentioned object and other objects, and novel features of the present invention become apparent from the description herein.

Solution to Problem

According to one embodiment of the present invention for achieving the above-mentioned object, there is provided a method of producing a rubber molded article, including a crosslinking step of crosslinking a rubber component by decomposing a compound to be used as a crosslinking agent for the rubber component, the compound having a structure represented by the following formula (I), in a rubber composition containing the rubber component and the compound, the rubber composition having a sulfur content of 2.0 wt % or less.

$$\alpha\text{-}\beta\text{-}\gamma \qquad (I)$$

(In the formula (I), α represents a monovalent organic group, β represents —N=N—, and γ represents hydrogen or a monovalent organic group.)

Further, the rubber composition may be free of any crosslinking agent other than the compound. Further, the rubber composition may be free of any sulfur compound, any peroxide, any quinoid compound, any phenol resin compound, any maleimide, and any polysulfide. Further, the rubber composition may be free of any radical scavenger for scavenging a radical derived from the compound. Further, the rubber composition may be free of any amine compound, any phenol compound, and any zinc oxide. Further, the crosslinking step may be performed under an atmospheric atmosphere. Further, the crosslinking step may include decomposing the compound to foam the rubber composition and crosslink the rubber component, and the rubber molded article may include a foam. Further, the rubber component may have a weight-average molecular weight of from 1,000 to 1,000,000.

Advantageous Effects of Invention

According to one embodiment of the present invention, the method of producing a rubber molded article, involving utilizing a compound different from a compound that has heretofore been used as a crosslinking agent, is provided.

DESCRIPTION OF EMBODIMENTS

The present invention has a feature in that a compound having a structure represented by the following formula (I) is used as a crosslinking agent for a rubber composition.

α-β-γ (I)

(In the formula (I), α represents a monovalent organic group, β represents —N═N—, and γ represents hydrogen or a monovalent organic group.)

As used herein, the term "crosslinking agent" refers to a compound that links (crosslinks) molecules of a rubber component, which is a polymer contained in the rubber composition, to each other, to thereby cause a reaction for changing physical and chemical properties.

For example, the compound having the structure represented by the formula (I) is decomposed when energy (the energy is described in detail later) is applied thereto. When decomposed, the compound having the structure represented by the formula (I) generates a radical of α representing a monovalent organic group in the formula (I) to cause a crosslinking reaction for crosslinking the rubber component contained in the rubber composition. That is, the rubber component contained in the rubber composition reacts with the radical of α. Consequently, molecules of the rubber component contained in the rubber composition are crosslinked to each other.

For example, the radical of α may act as a crosslinking initiator in the crosslinking reaction between molecules of the rubber component. That is, the compound having the structure represented by the formula (I) may be used as a crosslinking initiator for a rubber composition. In this case, a structure derived from the structure α in the formula (I) is not incorporated into the structure of a rubber molded article.

In addition, for example, the compound having the structure represented by the formula (I) may be used as a co-crosslinking agent for a rubber composition. That is, the compound having the structure represented by the formula (I) may be used as a co-crosslinking agent for a rubber composition. In this case, the rubber molded article to be molded contains, in a crosslinking portion in its structure, at least a structure derived from the structure α in the formula (I). In addition, the structure α is not incorporated into any portion of the rubber molded article other than the crosslinking portion.

In addition, γ in the formula (I) may represent a monovalent organic group. For example, the compound having the structure represented by the formula (I) is decomposed when energy is applied to the compound. When decomposed, the compound having the structure represented by the formula (I) generates a radical of γ representing a monovalent organic group in the formula (I) to cause a crosslinking reaction for crosslinking the rubber component contained in the rubber composition. That is, the rubber component contained in the rubber composition reacts with the radical of γ. Consequently, molecules of the rubber component contained in the rubber composition are crosslinked to each other.

For example, the radical of γ may act as a crosslinking initiator in the crosslinking reaction between molecules of the rubber component. That is, the compound having the structure represented by the formula (I) may be used as a crosslinking initiator for a rubber composition. In this case, a structure derived from the structure γ in the formula (I) is not incorporated into the structure of the rubber molded article.

In addition, for example, the compound having the structure represented by the formula (I) may be used as a co-crosslinking agent for a rubber composition. That is, the compound having the structure represented by the formula (I) may be used as a co-crosslinking agent for a rubber composition. In this case, the rubber molded article to be molded contains, in a crosslinking portion in its structure, at least a structure derived from the structure γ in the formula (I). In addition, the structure α is not incorporated into any portion of the rubber molded article other than the crosslinking portion.

In a method of the present invention, energy required for the crosslinking of the rubber component contained in the rubber composition substantially equals energy for generating a radical of the monovalent organic group α contained in the formula (I). That is, the energy required for the crosslinking of the rubber component substantially equals energy required for the decomposition of the compound having the structure represented by the formula (I). In addition, the energy required for the decomposition of the compound takes a unique value depending on the structure of the compound.

For example, the energy required for the decomposition of the compound having the structure represented by the formula (I) substantially equals energy for cleaving a bond between β and a carbon atom directly bonded thereto in the formula (I). In this connection, when a plurality of kinds of crosslinking agents are used in combination, crosslinking reactions of the rubber component contained in the rubber composition are separately initiated every time when energy required for the decomposition of any one of the crosslinking agents is achieved, and hence the rubber molded article may be non-uniformly crosslinked.

Therefore, in the method of the present invention, it is preferred to avoid the use of a compound other than the compound having the structure represented by the formula (I) in combination as a crosslinking agent. That is, the rubber composition may be free of any crosslinking agent other than the compound having the structure represented by the formula (I).

In addition, the method of the present invention may be a method involving using only the compound having the structure represented by the formula (I) as a crosslinking agent for a rubber composition. In addition, the method of the present invention may be a method involving using a compound being free of any sulfur compound, any peroxide, any quinoid compound, any phenol resin compound, any maleimide, and any polysulfide, the compound having the structure represented by the formula (I), as a crosslinking agent for a rubber composition. In addition, the present invention may be a method involving using only one kind of the compound having the structure represented by the formula (I) as a crosslinking agent for a rubber composition.

Herein, the peroxide in the present invention is a compound having a peroxide structure (—O—O—), as contained in a percarboxylic acid structure (—C(═O)—O—O—) or the like, in its structure. In addition, examples of the quinoid compound include p-quinone dioxime (VULNOC GM-P manufactured by OUCHI SHINKO CHEMICAL INDUSTRIAL CO., LTD.) and p,p'-dibenzoylquinone dioxime (VULNOC DGM manufactured by OUCHI SHINKO CHEMICAL INDUSTRIAL CO., LTD.). In addition, the phenol resin compound is a resin obtained by synthesis using a phenolic component such as phenol or cresol and formaldehyde as raw materials in the presence of a catalyst. Examples thereof include an alkylphenol resin (TACKIROL 201 manufactured by Taoka Chemical Co., Ltd.) and a halogenated alkylphenol formaldehyde resin (TACKIROL 250-I manufactured by Taoka Chemical Co., Ltd.).

In addition, for example, in a method involving using a peroxide as a crosslinking agent for a rubber composition, a COO radical (COO.) derived from the peroxide is easily deactivated by oxygen, and hence the crosslinking reaction needs to be performed under an inert gas atmosphere (under an inert atmosphere). That is, in the method involving using a peroxide as a crosslinking agent for a rubber composition, the reaction cannot be performed under an atmospheric atmosphere (the atmospheric atmosphere is described in detail later).

In contrast, the method involving using the compound having the structure represented by the formula (I) as a crosslinking agent for a rubber composition differs from the related-art crosslinking method involving utilizing a COO radical (COO.) derived from a peroxide, and hence may be performed under the atmospheric atmosphere.

A detailed description is given below of specific aspects of a method of producing a rubber molded article to which the method including using the compound having the structure represented by the formula (I) as a crosslinking agent for a rubber composition described above is applied.

A method of producing a rubber molded article according to this embodiment of the present invention includes a crosslinking step of crosslinking a rubber component by decomposing a compound to be used as a crosslinking agent for the rubber component, the compound having a structure represented by the formula (I), in a rubber composition containing the rubber component and the compound, the rubber composition having a sulfur content of 2.0 wt % or less.

First, the compound having the structure represented by the formula (I) to be used as the crosslinking agent for the rubber composition in this embodiment is described.

When decomposed, the compound having the structure represented by the formula (I) generates at least a radical of α. That is, α represents a monovalent organic group that generates a radical when the compound having the structure represented by the formula (I) is decomposed. More specifically, the compound having the structure represented by the formula (I) generates at least the radical of α through the cleavage of bonds between α and β and between β and γ when energy is applied thereto. That is, α represents a monovalent organic group that generates a radical when the compound having the structure represented by the formula (I) is decomposed by the application of energy to the rubber composition containing the compound.

Incidentally, α representing a monovalent organic group in the compound represented by the formula (I) may have at least one electron-withdrawing group in its structure. When α has at least one electron-withdrawing group in its structure, the compound having the structure represented by the formula (I) is easily decomposed, and as a result, the radical of a is easily generated. That is, when α has at least one electron-withdrawing group in its structure, the application of energy to the compound having the structure represented by the formula (I) from outside by heating or the like easily results in the cleavage of the bond between α and β.

In addition, when the radical of a is easily generated, the crosslinking of the rubber component contained in the rubber composition is accelerated.

Examples of the electron-withdrawing group contained in the structure of α include an amino group, a nitrile group, a carboxyl group, a nitroso group, an alkoxy group, a halogen group, and a monovalent functional group having a heterocyclic structure such as a thionyl group. That is, the electron-withdrawing group contained in α may be a functional group selected from the group consisting of an amino group, a nitrile group, a carboxyl group, a nitroso group, an alkoxy group, a halogen group, and a monovalent functional group having a heterocyclic structure. In addition, the halogen group may be a Br group, a F group, a Cl group, or an I group.

In addition, it is more preferred that any such electron-withdrawing group in the structure of a contained in the compound represented by the formula (I) be directly bonded to a carbon atom that is directly bonded to β. This is because of the following reason. In such case, the bond between α and β in the compound represented by the formula (I) is more easily cleaved when energy is externally applied, and the radical of a is generated more rapidly. As a result, the crosslinking of the rubber composition is rapidly performed.

Specific examples of the structure of a contained in the compound represented by the formula (I) are given below in the following formulae (α-1) to (α-5). α represented by each of the formulae (α-1) to (α-5) is a monovalent organic group that generates a radical when the compound having the structure represented by the formula (I) is decomposed. It should be noted that the following specific examples are merely examples, and the structure of α is not limited thereto.

[Chemical formula image 1]

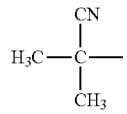

(α-1)

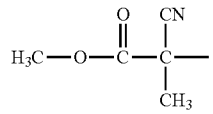

(α-2)

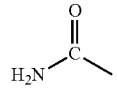

(α-3)

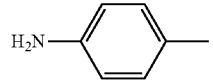

(α-4)

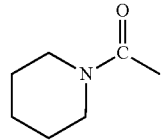

(α-5)

In addition, γ representing hydrogen or a monovalent organic group in the compound represented by the formula (I) may represent a monovalent organic group. In addition, when decomposed, the compound having the structure represented by the formula (I) may generate a radical of γ. That is, γ may represent a monovalent organic group that generates a radical when the compound having the structure represented by the formula (I) is decomposed.

More specifically, the compound having the structure represented by the formula (I) may generate a radical of γ through the cleavage of the bond between β and γ when energy is applied thereto. That is, γ may represent hydrogen or a monovalent organic group that generates a radical when the compound having the structure represented by the formula (I) is decomposed by the application of energy to the rubber composition containing the compound. In other cases, γ may represent a monovalent organic group that generates a radical when the compound having the structure represented by the formula (I) is decomposed by the application of energy to the rubber composition containing the compound.

In addition, when γ represents the monovalent organic group, γ may have at least one electron-withdrawing group in its structure. When γ has at least one electron-withdrawing group in its structure, the compound having the structure represented by the formula (I) is easily decomposed, and as a result, the radical of γ is easily generated. That is, when γ has at least one electron-withdrawing group in its structure, the application of energy to the compound having the structure represented by the formula (I) from outside by heating or the like easily results in the cleavage of the bond between β and γ.

Examples of the electron-withdrawing group contained in the structure of γ include an amino group, a nitrile group, a carboxyl group, a nitroso group, an alkoxy group, a halogen group, and a monovalent functional group having a heterocyclic structure such as a thionyl group. That is, the electron-withdrawing group contained in γ may be a functional group selected from the group consisting of an amino group, a nitrile group, a carboxyl group, a nitroso group, an alkoxy group, a halogen group, and a monovalent functional group having a heterocyclic structure. In addition, the halogen group may be a Br group, a F group, a Cl group, or an I group.

In addition, it is more preferred that any such electron-withdrawing group in the structure of γ contained in the compound represented by the formula (I) be directly bonded to a carbon atom that is directly bonded to β. This is because of the following reason. In such case, the bond between β and γ in the compound represented by the formula (I) is more easily cleaved when energy is externally applied, and the radical of γ is generated more rapidly. As a result, the crosslinking of the rubber composition is rapidly performed.

Specific examples of the structure of γ contained in the compound represented by the formula (I) are given below in the following formulae (γ-1) to (γ-5). γ represented by each of the formulae (γ-1) to (γ-5) is a monovalent organic group that generates a radical when the compound having the structure represented by the formula (I) is decomposed. It should be noted that the following specific examples are merely examples, and the structure of γ is not limited thereto.

[Chemical formula image 2]

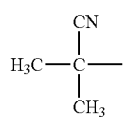

(γ-1)

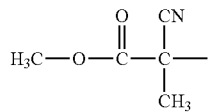

(γ-2)

-continued

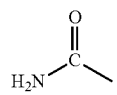

(γ-3)

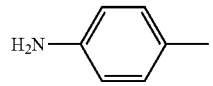

(γ-4)

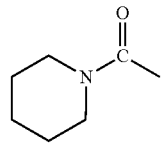

(γ-5)

In the method of producing a rubber molded article according to this embodiment, the energy to be applied to the rubber composition may be applied by energy ray irradiation, or may be applied by heating. In addition, examples of the energy ray include an electromagnetic wave, radiation, an electron beam, ultraviolet light, and infrared light.

That is, the crosslinking step in the method of producing a rubber molded article according to this embodiment may include decomposing the compound having the structure represented by the formula (I) by the application of energy, to thereby crosslink the rubber component, may include decomposing the compound having the structure represented by the formula (I) by heating, to thereby crosslink the rubber component, or may include decomposing the compound having the structure represented by the formula (I) by energy ray irradiation and heating, to thereby crosslink the rubber component.

In addition, the crosslinking step in the method of producing a rubber molded article according to this embodiment may include decomposing the compound having the structure represented by the formula (I) by heating to a temperature equal to or higher than the decomposition temperature of the compound, to thereby crosslink the rubber component.

Herein, the decomposition temperature of the compound refers to a temperature at which the bond between α and β, and/or bond between β and γ in the formula (I) is cleaved in the case of heating of only the compound having the structure represented by the formula (I). While the decomposition temperature of the compound is described in detail later, the decomposition temperature of the compound in the present invention is one determined by measuring an endothermic starting temperature (inflection point) using a differential scanning calorimeter (DSC) (TPA SCII2 manufactured by Rigaku Corporation). That is, on the assumption that the bond between α and β, and/or bond between β and γ in the formula (I) is cleaved at the endothermic starting temperature (inflection point) measured using the DSC, the endothermic starting temperature (inflection point) has been defined as the decomposition temperature of the compound.

Incidentally, the rubber composition in the method of producing a rubber molded article according to this embodiment may be free of any radical scavenger for scavenging a radical derived from the compound having the structure represented by the formula (I). As described above, the radical derived from the compound having the structure represented by the formula (I) is the radical of α and/or the radical of γ. In this context, the radical scavenger is a compound for scavenging the radical derived from the compound having the structure represented by the formula (I), to thereby inhibit a reaction between the rubber component and the radical.

Examples of the radical scavenger for scavenging the radical derived from the compound having the structure represented by the formula (I) include an amine compound, a phenol compound, and zinc oxide or the like. That is, the rubber composition in the method of producing a rubber molded article according to this embodiment may be free of any amine compound, any phenol compound, and any zinc oxide. Herein, the amine compound in the foregoing description is a compound obtained by substituting at least one of the hydrogen atoms of ammonia by a hydrocarbon group, and examples thereof include urea and biurea. In addition, the phenol compound is a compound obtained by substituting at least one of the hydrogen atoms of phenol by a hydrocarbon group.

Incidentally, some of the radical scavengers described above decrease the decomposition temperature of the compound having the structure represented by the formula (I). That is, the decomposition temperature of the compound having the structure represented by the formula (I) is decreased by, for example, mixing the compound with a chemical substance such as zinc oxide or urea.

In other words, in its coexistence with the chemical substance that reduces the decomposition temperature of the compound having the structure represented by the formula (I), the compound having the structure represented by the formula (I) is inhibited from acting as a crosslinking agent, that is, cannot be used as a crosslinking agent in some cases.

Accordingly, the rubber composition to be used in the method of producing a rubber molded article according to this embodiment may be free of any chemical substance that decreases the temperature at which the bond between $\alpha$ and $\beta$, and/or bond between $\beta$ and $\gamma$ in the formula (I) is cleaved in the case of heating of only the compound having the structure represented by the formula (I).

In addition, examples of the chemical substance that decreases the temperature at which the bond between $\alpha$ and $\beta$, and/or bond between $\beta$ and $\gamma$ in the formula (I) is cleaved in the case of heating of only the compound having the structure represented by the formula (I) include amine compounds and some metal oxides.

Accordingly, the rubber composition to be used in the method of producing a rubber molded article according to this embodiment may be free of any metal oxide and/or any amine compound that decreases the temperature at which the bond between $\alpha$ and $\beta$, and/or bond between $\beta$ and $\gamma$ in the formula (I) is cleaved in the case of heating of only the compound having the structure represented by the formula (I).

It should be noted that the radical scavenger for scavenging a radical derived from the compound having the structure represented by the formula (I), or the chemical substance that decreases the temperature at which the bond between $\alpha$ and $\beta$, and/or bond between $\beta$ and $\gamma$ in the formula (I) is cleaved in the case of heating of only the compound having the structure represented by the formula (I) may be added to the rubber composition as long as the effects of the present invention are not impaired.

In addition, a chemical substance that does not act as a radical scavenger in the rubber composition, and that decreases the temperature at which the bond between $\alpha$ and $\beta$, and/or bond between $\beta$ and $\gamma$ in the formula (I) is cleaved is exemplified by manganese dioxide, copper oxide, calcium oxide, calcium peroxide, potassium perchlorate, potassium nitrate, and activated carbon. The rubber composition to be used in this embodiment may contain manganese dioxide, copper oxide, calcium oxide, calcium peroxide, potassium perchlorate, potassium nitrate, or activated carbon.

Next, a description is made of the case where a plurality of kinds of crosslinking agents are used in combination in the method of producing a rubber molded article according to this embodiment.

As described above, the energy required for the decomposition of the compound having the structure represented by the formula (I) takes a unique value depending on the structure of the compound. For example, the energy required for the decomposition of the compound having the structure represented by the formula (I) substantially equals energy for cleaving the bond between $\alpha$ and $\beta$, and/or bond between $\beta$ and $\gamma$ in the formula (I). In this connection, when a plurality of kinds of crosslinking agents are used in combination, crosslinking reactions of the rubber composition are separately initiated every time when energy required for the decomposition of any one of the crosslinking agents is achieved, and the rubber molded article may be non-uniformly crosslinked.

Accordingly, in this embodiment, it is preferred to avoid the use of a compound other than the compound having the structure represented by the formula (I) in combination as a crosslinking agent. Accordingly, the rubber composition in the method of producing a rubber molded article according to this embodiment may be free of any crosslinking agent other than the compound having the structure represented by the formula (I). In addition, for example, the rubber composition in this embodiment may be free of any sulfur compound, any peroxide, any quinoid compound, any phenol resin compound, any maleimide, and any polysulfide as crosslinking agents. In addition, the rubber composition in this embodiment may be free of any sulfur compound, any peroxide, any quinoid compound, any phenol resin compound, any maleimide, and any polysulfide. In addition, the rubber composition in this embodiment may contain only one kind of the compound having the structure represented by the formula (I) as a crosslinking agent.

Next, the rubber composition to be used in the method of producing a rubber molded article according to this embodiment is described in more detail. As the rubber component contained in the rubber composition, there may be used one having a weight-average molecular weight of from 1,000 to 1,000,000 as appropriate. The kind of the rubber component is not particularly limited, and the rubber component may be, for example, a nitrile rubber (nitrile butadiene rubber: NBR), an isoprene rubber (isoprene rubber: IR), a styrene-butadiene rubber (SBR), or a butadiene rubber (BR).

That is, the compound having the structure represented by the formula (I) may be used as a crosslinking agent for a rubber composition including a rubber component selected from the group consisting of a nitrile rubber (nitrile butadiene rubber: NBR), an isoprene rubber (isoprene rubber: IR), a styrene-butadiene rubber (SBR), and a butadiene rubber (BR).

In addition, the rubber component contained in the rubber composition may contain, in its structure, 20 wt % or more of an unsaturated bond represented by —C=C—. When the rubber component contained in the rubber composition contains, in its structure, 20 wt % or more of the unsaturated bond represented by —C=C—, the crosslinking step of crosslinking the rubber composition can be easily performed.

In addition, the content of the unsaturated bond represented by —C=C— in the structure of the rubber component contained in the rubber composition may be 30 wt % or more, may be 40 wt % or more, may be 50 wt % or more, or may be 55 wt % or more. As the content of the unsaturated bond represented by —C=C— in the structure of the rubber component contained in the rubber composition becomes higher, the crosslinking step of crosslinking the rubber composition can be more easily performed. In addition, the content of the unsaturated bond represented by —C=C— in the structure of the rubber component contained in the rubber composition may be 90 wt % or less.

In addition, the weight-average molecular weight of the rubber component contained in the rubber composition may be from 3,000 to 1,000,000, may be from 3,000 to 500,000, or may be from 10,000 to 500,000. When the weight-average molecular weight of the rubber component contained in the rubber composition is 1,000 or less, the progress of the crosslinking reaction is suppressed. That is, the reaction for linking (crosslinking) molecules of the rubber component, which is a polymer contained in the rubber composition, to each other, to thereby change physical and chemical properties, is suppressed, which is not preferred.

The elongation at break characteristic of the rubber molded article to be obtained by the method of producing a rubber molded article according to this embodiment may be 10% or more (296K) and is preferably 50% or more (296K). In addition, the elongation at break is measured in conformity with ASTM D-1708.

In the rubber composition to be used in the method of producing a rubber molded article according to this embodiment, the content of the compound having the structure represented by the formula (I) may be from 1 part by weight to 30 parts by weight with respect to 100 parts by weight of the above-mentioned rubber component. In addition, the content of the compound having the structure represented by the formula (I) may be from 3 parts by weight to 30 parts by weight with respect to 100 parts by weight of the above-mentioned rubber component.

Incidentally, in the method of producing a rubber molded article according to this embodiment, it is desirable to use, as the rubber composition, one having as low a content of a sulfur component as possible. This is because free sulfur in the rubber molded article needs to be reduced. Then, in order to reduce free sulfur in the rubber molded article, the rubber composition serving as a raw material for the rubber molded article desirably has as low a content of a sulfur component as possible.

Therefore, the sulfur content in the rubber composition in the method of producing a rubber molded article according to this embodiment has been set to 2.0 wt % or less. In addition, the sulfur content in the rubber composition may be 1.0 wt % or less, or may be 0.25 wt % or less. Further, the rubber composition may be free of any sulfur component.

In addition, even if the rubber composition contains 2.0 wt % or less of a sulfur compound, the sulfur compound does not act as a crosslinking agent because its compounding amount in the rubber composition is small.

When the above-mentioned rubber composition is used, the rubber molded article to be obtained by the method of producing a rubber molded article according to this embodiment is a rubber molded article having a sulfur content of 2.0 wt % or less. In addition, the rubber molded article to be obtained by the method of producing a rubber molded article of the present invention is more preferably a rubber molded article having a sulfur content of 1.0 wt % or less, particularly preferably a rubber molded article having a sulfur content of 0.25 wt % or less.

When the rubber molded article contains more than 2.0 wt % of sulfur, a metal part brought into contact with the rubber molded article may be discolored and corroded, which may result in an increase in electrical resistance, namely, so-called poisoning reduction.

Now, an analysis method for the sulfur content of the rubber molded article is described. The sulfur content of the rubber molded article in the present invention was measured by separating and quantifying the sulfur component contained in the rubber molded article using ion chromatography through the use of ion chromatography (ion chromatograph ICS-1500 manufactured by Nippon Dionex K.K.) and a combustion IC preparation system (combustion IC preparation system AQF-100 manufactured by Mitsubishi Chemical Analytech Co., Ltd.), through the use of an inorganic anion column (IonPac AS12A manufactured by Nippon Dionex K.K.) as a separation column, and through the use of an electric conductivity detector.

It should be noted that the analysis method for the sulfur content of the rubber molded article described above is not limited to the above-mentioned method, and for example, the sulfur component may be separated using any other column.

In addition, the rubber molded article to be obtained by the method of producing a rubber molded article according to this embodiment may be a rubber molded article containing free sulfur at 0.1 wt % or less. In addition, the rubber molded article to be obtained by the method of producing a rubber molded article of the present invention is more preferably a rubber molded article containing free sulfur at 0.05 wt % or less, particularly preferably a rubber molded article containing free sulfur at 0.01 wt % or less.

In addition, the term "free sulfur" as used in the present invention refers, among sulfur contained in the rubber molded article, to sulfur involved in weak chemical bonding and/or in no chemical bonding, the sulfur being likely to physically migrate out of the rubber molded article by, for example, heat, moisture, or an organic solvent from outside.

Now, an analysis method for free sulfur in the rubber molded article is described. Free sulfur in the rubber molded article in the present invention was measured by an ICP emission analysis method using ICP-MS (ICP-AES ICPS-1000IV manufactured by SHIMADZU CORPORATION). More specifically, 1 g of the rubber molded article as an analysis object was weighed and put into a cylindrical glass filter. After that, the cylindrical glass filter was set in a Soxhlet extractor, and extraction was performed with 80 ml of a methanol solvent at 80° C. for 6 hours. After the extraction, methanol as the extraction solvent was removed with an evaporator, and the residue was left to stand at 23° C. for 8 hours to afford an extract. Next, the extract, 10 ml of nitric acid, and 5 ml of perchloric acid were mixed to prepare a solution, and the solution was heated until white fumes of perchloric acid were generated. After the heating, further, the solution was allowed to cool to room temperature, and ion-exchanged water was added thereto to accurately adjust the total amount to 100 ml. Thus, an analyte solution was obtained.

Then, the analyte solution was introduced into the ICP-MS, and subjected to quantitative analysis of free sulfur. That is, the analyte solution obtained by the pretreatment, which has been nebulized with a concentric nebulizer, is introduced into plasma generated using a high-frequency generator of the ICP-MS (output: 1,200 W), and then into a cyclone chamber, and is excited to emit light. Then, the emitted light was subjected to spectral separation with a spectrometer of the ICP-MS, the intensity of the emitted light at a wavelength for quantification of 182.037 nm was detected with a photomultiplier tube, and the resultant electrical signal was processed, to thereby determine the abundance of sulfur (that is, the amount of free sulfur). The quantification of free sulfur was performed using a calibration curve method (0 to 20 ppm).

In addition, in the method of producing a rubber molded article according to this embodiment, it is desirable to use, as the compound having the structure represented by the formula (I) to be used as a crosslinking agent, one having as low a content of a sulfur component in its structure as possible. Therefore, the sulfur content in the compound having the structure represented by the formula (I) may be 0.1 wt % or less, may be 0.05 wt % or less, or may be 0.01 wt % or less. Further, the compound having the structure represented by the formula (I) may be free of any sulfur component.

That is, in the formula (I), α represents a monovalent organic group and its structure may be free of any sulfur. In addition, in the formula (I), γ represents hydrogen or a monovalent organic group, and the structure of γ may be free of any sulfur.

In addition, in the method of producing a rubber molded article according to this embodiment, it is also desirable to use, as the rubber component contained in the rubber composition, one having as low a content of a sulfur component in its structure as possible, as in the compound having the structure represented by the formula (I). Therefore, the sulfur content in the rubber component contained in the rubber composition may be 0.1 wt % or less, may be 0.05 wt % or less, or may be 0.01 wt % or less. Further, the rubber component contained in the rubber composition may be free of any sulfur component.

Next, the crosslinking step in the method of producing a rubber molded article according to this embodiment is described. The crosslinking step in the method of producing a rubber molded article according to this embodiment may be performed under an atmospheric atmosphere.

As described above, for example, in the related-art crosslinking method involving using a peroxide as a crosslinking agent for a rubber composition, a COO radical (COO.) derived from the peroxide is easily deactivated by oxygen, and hence the crosslinking reaction needs to be performed under an inert gas atmosphere (under an inert atmosphere). That is, in the method involving using a peroxide as a crosslinking agent for a rubber composition, the reaction cannot be performed under an atmospheric atmosphere.

In contrast, in the case of the compound having the structure represented by the formula (I) to be used in the method of producing a rubber molded article according to this embodiment, the radical of α or radical of γ derived from the compound is not deactivated by oxygen, and hence the crosslinking of the rubber component contained in the rubber composition can be performed under an atmospheric atmosphere.

Thus, the crosslinking step in the method of producing a rubber molded article according to this embodiment can be continuously performed on a conveying apparatus. The term "conveying apparatus" as used herein refers to, for example, a belt conveyor to be installed in a production line.

In addition, the atmospheric atmosphere in the present invention refers to an atmospheric atmosphere containing oxygen. That is, the atmospheric atmosphere refers to an atmospheric atmosphere in which a COO radical (COO.) derived from a peroxide, which has heretofore been used as a crosslinking agent, is deactivated. For example, the atmospheric atmosphere in the present invention may be an air atmosphere, may be an atmospheric atmosphere containing about 80 vol % of nitrogen and about 20 vol % of oxygen, or may be an atmospheric atmosphere having an oxygen volume content of 10 vol % or more, 3 vol % or more, or 1 vol % or more.

In addition, the crosslinking step may include decomposing the compound having the structure represented by the formula (I), to thereby foam the rubber composition and crosslink the rubber component. The rubber molded article may thus be a foam. That is, the rubber molded article may be a porous body having a plurality of voids inside.

When the compound having the structure represented by the formula (I) is decomposed, a nitrogen gas derived from β in the structure represented by the formula (I) is generated. In addition, the nitrogen gas is generated at the same timing as the generation of the radical of α (and/or radical of β) derived from α (and/or β) in the structure represented by the formula (I). When the rubber molded article that is a foam, namely, a foamed rubber molded article is produced, the crosslinking of the rubber component and the foaming of the rubber composition are performed at the ideal timing through the use of the compound having the structure represented by the formula (I) as a crosslinking agent.

In addition, in the method of producing a rubber molded article according to this embodiment, when the crosslinking step includes decomposing the compound having the structure represented by the formula (I), to thereby foam the rubber composition and crosslink the rubber component, the rubber molded article is a foam and the rubber molded article may have a thickness of 0.050 mm or more. In addition, the thickness of the rubber molded article may be 0.065 mm or more, or may be 0.150 mm or more.

In addition, in the method of producing a rubber molded article according to this embodiment, when the crosslinking step includes decomposing the compound having the structure represented by the formula (I), to thereby foam the rubber composition and crosslink the rubber component, the rubber molded article is a foam and the rubber molded article may have a foaming factor of 1.2 or more. In addition, the foaming factor of the rubber molded article may be 1.3 or more, or may be 1.9 or more. Herein, the foaming factor is calculated by the following expression: volume of rubber molded article after foaming/volume of rubber molded article assumed to have no void inside.

In addition, the rubber composition to be used in this embodiment may contain, for example, fillers such as carbon black, calcium carbonate, silica, alumina, a silicate mineral (e.g., mica or talc), barium sulfate, and an organic reinforcing material, or an antioxidant, as long as the effects of the present invention are not impaired.

EXAMPLES

The present invention is specifically described below by way of Examples. It should be noted that Examples below are for the purpose of specifically describing embodiments of the present invention, and do not limit the scope of the present invention.

First, rubber compositions (R1 to R17) shown in Tables 1A to 1C were prepared. Compounds to be used as crosslinking agents in Tables 1A to 1C have chemical structures obtained by combining α structures represented by the following formulae (α-1) to (α-6), β structures represented by the following formulae (β-1) to (β-3), and γ structures represented by the following formulae (γ-1) to (γ-6).

The rubber compositions R1 to R10 shown in Tables 1A and 1B each use NBR (N237 manufactured by JSR Corporation) as a rubber component and each use a different kind of compound as a crosslinking agent. For example, the rubber composition R1 is obtained by compounding 100 parts by weight of NBR (N237 manufactured by JSR Corporation) with 12 parts by weight of azodicarbonamide (ADCA) serving as the compound to be used as the crosslinking agent.

In addition, rubber compositions R11 to 17 shown in Table 1C each use azodicarbonamide (ADCA) as the compound to be used as the crosslinking agent and each use a different kind of rubber component. Here, N260S manufactured by JSR Corporation is NBR containing a CN unit at 15 wt %, N241 manufactured by JSR Corporation is NBR containing a CN unit at 29 wt %, N237 manufactured by JSR Corporation is NBR containing a CN unit at 34 wt %, and N222L manufactured by JSR Corporation is NBR containing a CN unit at 43 wt %.

[Chemical formula image 3]

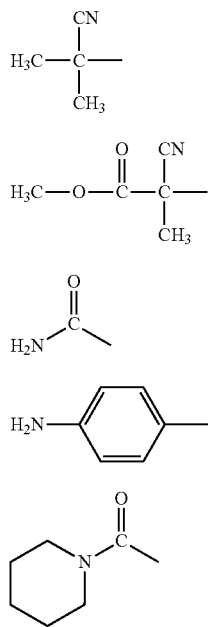

(α-1)

(α-2)

(α-3)

(α-4)

(α-5)

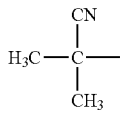

(α-6)

[Chemical formula image 4]

—N═N— (β-1)

—HN—NH— (β-2)

—HC═CH— (β-3)

[Chemical formula image 5]

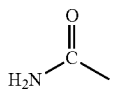

(γ-1)

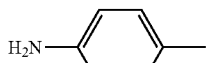

(γ-2)

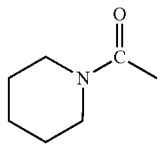

(γ-3)

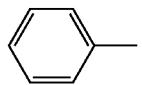

(γ-4)

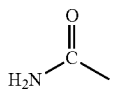

(γ-5)

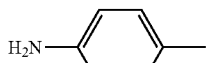

(γ-6)

TABLE 1A

| | | | Rubber composition No. | | | | |
|---|---|---|---|---|---|---|---|
| | | | R1 | R2 | R3 | R4 | R5 |
| | | Rubber component | | | | | |
| | NBR (N237 manufactured by JSR Corporation) | | | | | | |
| Compound | α structure | β structure | γ structure | 100 | 100 | 100 | 100 | 100 |
| Azodicarbonamide (ADCA) | α-3 | β-1 | γ-3 | 12.00 | | | | |
| 4-Aminoazobenzene | α-4 | β-1 | γ-6 | | 20.39 | | | |
| 1-[(1-Cyano-1-methylethyl)azo]formamide | α-1 | β-1 | γ-3 | | | 14.49 | | |
| 1,1'-(Azodicarbonyl)dipiperidine | α-5 | β-1 | γ-5 | | | | 26.08 | |
| 2,2'-Azobis(isobutyronitrile) | α-1 | β-1 | γ-1 | | | | | 16.97 |

TABLE 1B

| Compound | α structure | β structure | γ structure | R6 | R7 | R8 | R9 | R10 |
|---|---|---|---|---|---|---|---|---|
| Rubber component NBR (N237 manufactured by JSR Corporation) | | | | 100 | 100 | 100 | 100 | 100 |
| Dimethyl 2,2'-azo-bis(2-methylpropionate) | α-2 | β-1 | γ-2 | 16.97 | | | | |
| Acetamide | α-3 | — | —H | | 26.08 | | | |
| Urea | α-3 | — | —NH$_2$ | | | 16.97 | | |
| Biurea | α-3 | β-3 | γ-3 | | | | 12.21 | |
| Fumaramide | α-3 | β-2 | γ-3 | | | | | 11.79 |

TABLE 1C

| | Rubber composition No. | R11 | R12 | R13 | R14 | R15 | R16 | R17 |
|---|---|---|---|---|---|---|---|---|
| Rubber component | NBR (N260S manufactured by JSR Corporation) | 100 | | | | | | |
| | NBR (N241 manufactured by JSR Corporation) | | 100 | | | | | |
| | NBR (N237 manufactured by JSR Corporation) | | | 100 | | | | |
| | NBR (N222L manufactured by JSR Corporation) | | | | 100 | | | |
| | IR (IR2200 manufactured by Zeon Corporation) | | | | | 100 | | |
| | SBR (1502 manufactured by Zeon Corporation) | | | | | | 100 | |
| | BR (BR01 manufactured by JSR Corporation) | | | | | | | 100 |
| Compound | Azodicarbonamide (ADCA) | 12.0 | 12.0 | 12.0 | 12.0 | 12.0 | 12.0 | 12.0 |

For each of the rubber compositions Nos. R1 to R17, the rubber component and the compound to be used as the crosslinking agent were kneaded with an 8-inch open roll, put into a mold measuring 50 mm×50 mm×2 mm, and press-molded into an uncrosslinked rubber sheet. Then, the uncrosslinked rubber sheet was put into a hot air circulation type gear oven, and subjected to heat treatment at a predetermined temperature for a predetermined period of time.

The heat treatment corresponds to the crosslinking step in the present invention including decomposing each compound shown in Tables 1A to 1C by the application of energy to the rubber composition and using the compound as the crosslinking agent for a rubber composition, to thereby crosslink the rubber component contained in the rubber composition. In this example, the crosslinking step was performed in each of the case where the heat treatment was performed under an atmospheric atmosphere (nitrogen: about 80 vol %, oxygen: about 20 vol %) and the case where the heat treatment was performed under an inert gas (nitrogen) atmosphere.

Table 2 below shows the temperature and time of the heat treatment, and decomposition temperature of the compound used as the crosslinking agent in this example. In this context, the decomposition temperature of the compound refers to a temperature at which the bond between the α structure and the β structure, and/or bond between the β structure and the γ structure in each compound is cleaved in the case of heating of only the compound. As shown in Table 2, the heat treatment temperature in this example is higher than the decomposition temperature of the compound.

Now, a measurement method for the decomposition temperature of the compound is described. The decomposition temperature of the compound in the present invention was measured by measuring an endothermic starting temperature (inflection point) using a differential scanning calorimeter (DSC) (TPA SCII2 manufactured by Rigaku Corporation). That is, the endothermic starting temperature (inflection point) of the compound obtained by the DSC measurement was defined as the decomposition temperature of the compound. More specifically, the conditions of the DSC measurement were as follows: 10 mg of the compound as a measurement object were placed on an aluminum sample dish, the temperature was increased under the condition of 10° C./min, and the endothermic starting temperature (that is, the decomposition temperature) was measured using β-Al$_2$O$_3$ as a reference sample.

TABLE 2

| Rubber composition No. | Compound | Decomposition temperature of compound/ °C. | Heat treatment Temperature/ °C. | Time/ min |
|---|---|---|---|---|
| R1 | Azodicarbonamide (ADCA) | 210 | 210 | 10 |
| R2 | 4-Aminoazobenzene | 200 | 200 | 240 |
| R3 | 1-[(1-Cyano-1-methylethyl)azo]formamide | 130 | 130 | 240 |
| R4 | 1,1'-(Azodicarbonyl)dipiperidine | 200 | 200 | 240 |
| R5 | 2,2'-Azobis(isobutyronitrile) | 100 | 100 | 240 |
| R6 | Dimethyl 2,2'-azobis(2-methylpropionate) | 70 | 70 | 240 |
| R7 | Acetamide | 50 | 50 | 240 |
| R8 | Urea | 170 | 170 | 240 |
| R9 | Biurea | 250 | 250 | 240 |
| R10 | Fumaramide | 180 | 180 | 240 |
| R11 to R17 | Azodicarbonamide (ADCA) | 210 | 210 | 10 |

A rubber molded article after heat treatment was cut into a piece measuring φ13 mm×2 mm, which was immersed in a good solvent for the rubber component at 23° C. for 24 hours, and the presence or absence of the dissolution of the rubber molded article in the good solvent was visually confirmed. If the rubber composition is crosslinked, the rubber molded article after crosslinking does not dissolve in the good solvent. Therefore, the presence or absence of crosslinking was evaluated according to the following two criteria depending on the presence or absence of the dissolution of the rubber molded article in the good solvent: ○: the rubber molded article did not dissolve in the good solvent, confirming that crosslinking progressed; and x: the rubber molded article dissolved in the good solvent, confirming that crosslinking did not progress. Table 3 below shows the evaluation results.

TABLE 3

| Rubber composition No. | Compound | Rubber component (good solvent) | Crosslinking Under atmospheric atmosphere | Under N$_2$ atmosphere |
|---|---|---|---|---|
| R1 | Azodicarbonamide (ADCA) | NBR (N237 manufactured by JSR Corporation) (toluene) | ○ | ○ |
| R2 | 4-Aminoazobenzene | NBR (N237 manufactured by JSR Corporation) (toluene) | ○ | ○ |
| R3 | 1-[(1-Cyano-l-methylethyl)azo]formamide | NBR (N237 manufactured by JSR Corporation) (toluene) | ○ | ○ |
| R4 | 1,1'-(Azodicarbonyl)dipiperidine | NBR (N237 manufactured by JSR Corporation) (toluene) | ○ | ○ |
| R5 | 2,2'-Azobis(isobutyronitrile) | NBR (N237 manufactured by JSR Corporation) (toluene) | ○ | ○ |
| R6 | Dimethyl 2,2'-azobis(2-methylpropionate) | NBR (N237 manufactured by JSR Corporation) (toluene) | x | ○ |
| R7 | Acetamide | NBR (N237 manufactured by JSR Corporation) (toluene) | x | x |
| R8 | Urea | NBR (N237 manufactured by JSR Corporation) (toluene) | x | x |
| R9 | Biurea | NBR (N237 manufactured by JSR Corporation) (toluene) | x | x |
| R10 | Fumaramide | NBR (N237 manufactured by JSR Corporation) (toluene) | x | x |
| R11 | Azodicarbonamide (ADCA) | NBR (N260S manufactured by JSR Corporation) (toluene) | ○ | ○ |
| R12 | | NBR (N241 manufactured by JSR Corporation) (toluene) | ○ | ○ |
| R13 | | NBR (N237 manufactured by JSR Corporation) (toluene) | ○ | ○ |
| R14 | | NBR (N222L manufactured by JSR Corporation) (MEK) | ○ | ○ |
| R15 | | IR (IR2200 manufactured by Zeon Corporation) (n-hexane) | ○ | ○ |
| R16 | | SBR (1502 manufactured by Zeon Corporation) (toluene) | ○ | ○ |
| R17 | | BR (BR01 manufactured by JSR Corporation) (toluene) | ○ | ○ |

As shown in Table 3, it was confirmed in each of the rubber compositions Nos. R1 to R6 that crosslinking progressed under the inert gas (nitrogen) atmosphere. In addition, each of the rubber components and compounds used as the crosslinking agents contained in the rubber compositions Nos. R1 to R6 had a sulfur content of 0.25 wt % or less, and the obtained rubber molded articles had sulfur contents of 0.25 wt % or less and contained free sulfur at 0.1 wt % or less.

In addition, as shown in Table 3, it was confirmed in each of the rubber compositions Nos. R1 to R5 that crosslinking progressed even under the atmospheric atmosphere, and the obtained rubber molded article contained free sulfur at 0.1 wt % or less.

In addition, as shown in Table 3, it was confirmed in each of the rubber compositions Nos. R11 to R17, containing different rubber components, that when the compound having the structure represented by the formula (I) was used as the crosslinking agent, crosslinking progressed under each of the following crosslinking conditions: under the atmospheric atmosphere (nitrogen: about 80 vol %, oxygen: about 20 vol %) and under the inert gas (nitrogen) atmosphere.

Next, a rubber composition containing 100 parts by weight of NBR (rubber component: N237 manufacture by JSR), 50 parts by weight of carbon black (filler: N990 manufactured by Cancarb), and 12 parts by weight of a compound having the structure represented by the formula (I) (crosslinking agent: ADCA) was prepared. The rubber composition was kneaded with an 8-inch open roll, put into a mold measuring 50 mm by 50 mm by a predetermined thickness (from 0.026 to 0.159 mm), and press-molded into an uncrosslinked rubber sheet. Then, the uncrosslinked rubber sheet was put into a hot air circulation type gear oven, and subjected to heat treatment at a predetermined temperature for a predetermined period of time, to simultaneously perform foaming and the crosslinking of the rubber component.

Then, the thickness of the uncrosslinked rubber sheet and the thickness of the rubber molded article after the crosslinking step were measured to confirm a foaming state and a foaming factor. In this example, the crosslinking step was performed in such a manner as not to cause changes between the vertical and horizontal dimensions of the uncrosslinked rubber sheet and the vertical and horizontal dimensions of the rubber molded article after the crosslinking step. Accordingly, the foaming factor can be determined by the following expression: thickness of rubber molded article after foaming/thickness of uncrosslinked rubber sheet before foaming.

Table 4 shows the results of the measurement of the thickness of the uncrosslinked rubber sheet before foaming (rubber thickness before foaming) and the thickness of the rubber molded article after the crosslinking step of simultaneously performing foaming and the crosslinking of the rubber component (rubber thickness after foaming). The foaming state in Table 4 was evaluated according to the following criteria.

No foaming: The rubber molded article has no void inside or has voids in only tiny part of its inside.

Partial foaming: The rubber molded article has voids in part of its inside.

Complete foaming: The rubber molded article has voids inside and has a foaming factor of 2 or more.

TABLE 4

| Rubber thickness before foaming/mm | Rubber thickness after foaming/mm | Foaming factor | Foaming state |
| --- | --- | --- | --- |
| 0.026 | 0.026 | 1.0 | No foaming |
| 0.037 | 0.039 | 1.1 | No foaming |
| 0.049 | 0.066 | 1.3 | Partial foaming |
| 0.065 | 0.105 | 1.6 | Partial foaming |
| 0.085 | 0.165 | 1.9 | Complete foaming |
| 0.120 | 0.246 | 2.1 | Complete foaming |
| 0.159 | 0.347 | 2.2 | Complete foaming |

As shown in Table 4, when the crosslinking step included decomposing the compound having the structure represented by the formula (I) by the application of energy to the rubber composition, to thereby perform the foaming and the crosslinking of the rubber component, the rubber molded article after the crosslinking step had voids inside, and the rubber molded article had a thickness of 0.050 mm or more. In addition, when the rubber molded article had a thickness of 0.150 mm or more, the rubber molded article had a foaming factor of 2.0 or more. In addition, when the crosslinking step included decomposing the compound having the structure represented by the formula (I), to thereby perform the foaming and the crosslinking of the rubber component, the rubber molded article had voids inside, and the rubber molded article had a foaming factor of 1.2 or more.

The invention claimed is:

1. A method of producing a rubber molded article, comprising:
crosslinking a rubber component by decomposing a compound to be used as a crosslinking agent for the rubber component, the compound reacts with the rubber component to crosslink the rubber component, and has a structure represented by the following formula (I), in a rubber composition containing the rubber component and the compound, the rubber composition having a sulfur content of 0.25 wt % or less,
wherein the rubber composition is free of any crosslinking agent other than the compound to be used as a crosslinking agent,
wherein the rubber component comprises nitrile rubber,
wherein the nitrile rubber comprises a copolymer that consists of acrylonitrile and butadiene, respectively
wherein the rubber component has 20 wt % to 90 wt % of an unsaturated bond represented by —C═C— in its structure,
wherein a content of the compound having the structure represented by the formula (I) is 12 parts by weight to 30 parts by weight with respect to 100 parts by weight of the rubber component, and:

$$\alpha\text{-}\beta\text{-}\gamma \tag{I}$$

in the formula (I),
α represents a monovalent organic group selected from the group consisting of the following formulae (α-1) to (α-5)

-continued (α-2)
$$H_3C-O-\overset{\overset{O}{\|}}{C}-\overset{\overset{CN}{|}}{\underset{\underset{CH_3}{|}}{C}}-$$

(α-3)
$$H_2N-\overset{\overset{O}{\|}}{C}\diagdown$$

(α-4)
$$H_2N-\!\!\left\langle\!\!\bigcirc\!\!\right\rangle\!\!-$$

(α-5)
$$\underset{\text{piperidine-N}}{\bigcirc}\!\!-\!\!\overset{\overset{O}{\|}}{C}\diagdown,$$

β represents —N=N—, and
γ represents hydrogen or a monovalent organic group selected from the group consisting of the following formulae (γ-1) to (γ-5)

(γ-1)
$$H_3C-\overset{\overset{CN}{|}}{\underset{\underset{CH_3}{|}}{C}}-$$

(γ-2)
$$H_3C-O-\overset{\overset{O}{\|}}{C}-\overset{\overset{CN}{|}}{\underset{\underset{CH_3}{|}}{C}}-$$

(γ-3)
$$H_2N-\overset{\overset{O}{\|}}{C}\diagdown$$

(γ-4)
$$H_2N-\!\!\left\langle\!\!\bigcirc\!\!\right\rangle\!\!-$$

(γ-5)
$$\underset{\text{piperidine-N}}{\bigcirc}\!\!-\!\!\overset{\overset{O}{\|}}{C}\diagdown.$$

2. The method of producing a rubber molded article according to claim 1, wherein the rubber composition is free of any sulfur compound, any peroxide, any quinoid compound, any phenol resin compound, any maleimide, and any polysulfide.

3. The method of producing a rubber molded article according to claim 1, wherein the rubber composition is free of any radical scavenger for scavenging a radical derived from the compound.

4. The method of producing a rubber molded article according to claim 1, wherein the rubber composition is free of any amine compound, any phenol compound, and any zinc oxide.

5. The method of producing a rubber molded article according to claim 1, wherein the crosslinking is performed under an atmospheric atmosphere.

6. The method of producing a rubber molded article according to claim 1,
wherein the crosslinking comprises decomposing the compound to foam the rubber composition and crosslink the rubber component, and
wherein the rubber molded article comprises a foam.

7. The method of producing a rubber molded article according to claim 1, wherein the rubber component has a weight-average molecular weight of from 1,000 to 1,000,000.

8. A method comprising:
adding a compound having a structure represented by the following formula (I) that reacts with a rubber component of a rubber composition to crosslink the rubber component of the rubber composition,
wherein the rubber composition is free of any crosslinking agent other than the compound used as the crosslinking agent,
wherein the rubber component has 20 wt % to 90 wt % of an unsaturated bond represented by —C=C— in its structure,
wherein a content of the compound having the structure represented by the formula (I) is 12 parts by weight to 30 parts by weight with respect to 100 parts by weight of the rubber component,
wherein the rubber composition comprises a rubber component comprising a nitrile rubber,
wherein the nitrile rubber comprises a copolymer that consists of acrylonitrile and butadiene, respectively:

α-β-γ  (I)

in the formula (I),
α represents a monovalent organic group selected from the group consisting of the following formulae (α-1) to (α-5)

(α-1)
$$H_3C-\overset{\overset{CN}{|}}{\underset{\underset{CH_3}{|}}{C}}-$$

(α-2)
$$H_3C-O-\overset{\overset{O}{\|}}{C}-\overset{\overset{CN}{|}}{\underset{\underset{CH_3}{|}}{C}}-$$

(α-3)
$$H_2N-\overset{\overset{O}{\|}}{C}\diagdown$$

(α-4)
$$H_2N-\!\!\left\langle\!\!\bigcirc\!\!\right\rangle\!\!-$$

(α-5)
$$\underset{\text{piperidine-N}}{\bigcirc}\!\!-\!\!\overset{\overset{O}{\|}}{C}\diagdown,$$

β represents —N=N—, and
γ represents hydrogen or a monovalent organic group selected from the group consisting of the following formulae (γ-1) to (γ-5)

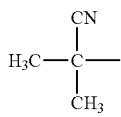 (γ-1)

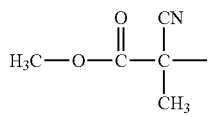 (γ-2)

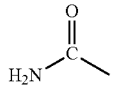 (γ-3)

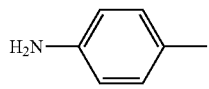 (γ-4)

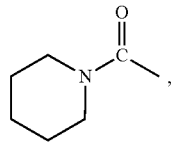 (γ-5)

and
wherein the rubber composition has a sulfur content of 0.25 wt % or less.

9. A rubber composition, comprising:
a rubber component; and
a compound that reacts with the rubber component to crosslink the rubber component, the compound having a structure represented by the following formula (I),
wherein the rubber composition is free of any crosslinking agent other than the compound to be used as the crosslinking agent,
wherein the rubber component has 20 wt % to 90 wt % of an unsaturated bond represented by —C=C— in its structure,
wherein a content of the compound having the structure represented by the formula (I) is 12 parts by weight to 30 parts by weight with respect to 100 parts by weight of the rubber component,
wherein the rubber composition has a sulfur content of 0.25 wt % or less, and
wherein the rubber component comprises nitrile rubber,
wherein the nitrile rubber comprises a copolymer that consists of acrylonitrile and butadiene, respectively:

α-β-γ (I)

in the formula (I),
α represents a monovalent organic group selected from the group consisting of the following formulae (α-1) to (α-5)

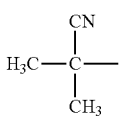 (α-1)

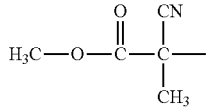 (α-2)

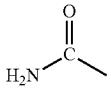 (α-3)

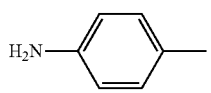 (α-4)

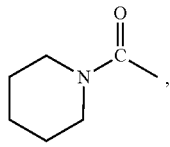 (α-5)

β represents —N=N—, and
γ represents hydrogen or a monovalent organic group selected from the group consisting of the following formulae (γ-1) to (γ-5)

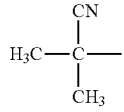 (γ-1)

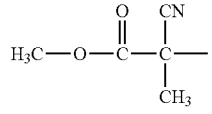 (γ-2)

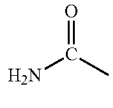 (γ-3)

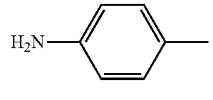 (γ-4)

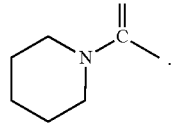 (γ-5)

10. A rubber molded article, which is produced by the method of producing a rubber molded article according to claim 1,
wherein the rubber molded article has a sulfur content of 0.25 wt % or less.

11. The rubber composition according to claim 9, wherein the rubber component further comprises a rubber selected from the group consisting of the nitrile rubber, the isoprene rubber, the styrene-butadiene rubber, and the butadiene rubber.

12. The rubber composition according to claim 9, wherein the rubber component is nitrile rubber.

13. The method of producing a rubber molded article according to claim 1, wherein the rubber component is nitrile rubber.

14. The method according to claim 8, wherein the rubber component is nitrile rubber.

\* \* \* \* \*